May 9, 1939.  R. H. ZEILMAN  2,157,376
SEMITRAILER LOAD HANDLING MACHINE MECHANISM
Filed Feb. 3, 1937
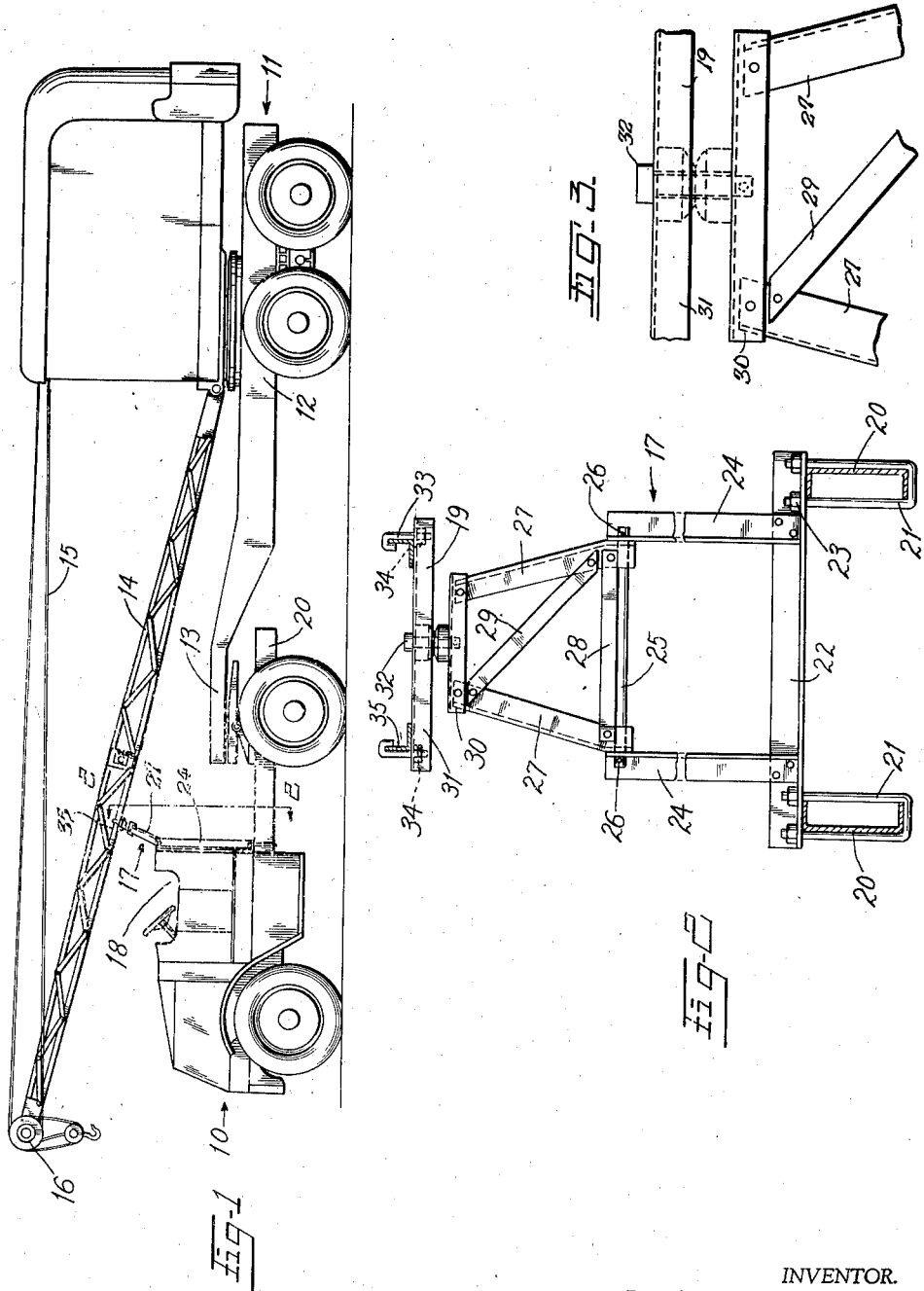
INVENTOR.
Roy H. Zeilman.
BY
His ATTORNEYS Patented May 9, 1939

2,157,376

UNITED STATES PATENT OFFICE 2,157,376

SEMITRAILER LOAD HANDLING MACHINE MECHANISM

Roy H. Zeilman, Lorain, Ohio, assignor to Thew Shovel Company, Lorain, Ohio, a corporation of Ohio Application February 3, 1937, Serial No. 123,828

5 Claims. (Cl. 224—29)

This invention relates to load handling machines, including a boom of the semi-trailer type adapted to be drawn by a motor truck and more particularly to means controlling boom movement during travel.

Load handling machines of the semi-trailer type are adapted to be moved from one location to another by motor power furnished from a motor truck or the like rather than under power from the load handling machine itself. Although the load handling machine may be movable under its own power at the scene of operation, it is desirable, in order to expedite movement from one scene of operation to another, that the machine be moved by independent automotive trucks. This is usually effected by providing a forwardly extending arm on the load handling machine which may be pivotally secured to the rear of the motor truck with the boom extending forwardly over the driving compartment of the truck. The boom will be of varying length but, in any event, will project a substantial distance forwardly of the pivotal connection with the motor truck so that, in turning, the boom would extend laterally of the motor truck necessitating considerable side clearance and creating an undesirable lateral loading condition.

I have provided a support and guide means for the boom on the motor truck and adjacent the driving compartment whereby the forward portion of the boom will be carried with the truck in turning and largely eliminate the aforementioned conditions as to side clearance and loading.

It is an object of my invention therefore to provide a guide means for a boom associated with a semi-trailer secured to a motor truck minimizing lateral clearance required for the boom when turning.

Another object of my invention is to provide a support means associated with a motor truck adapted to haul a semi-trailer upon which a boom is mounted and whereby the support means will cooperate with the normal supporting means of the boom to maintain the boom at a desired height about the driving compartment of the motor truck and minimize lateral swinging of the forward end of the boom with resultant increased safety to the driver and elimination of injury due to the boom encountering lateral obstructions.

Another object of my invention is to provide improved means for rapidly transporting a load handling machine including a boom mounted on a semi-trailer.

Another object of my invention is to provide a support and guide means for a boom adapted to be quickly secured to and detached from a motor truck adapted to haul a load handling machine.

Other objects of my invention and the invention itself will become increasingly apparent from a consideration of the following description and drawing wherein:

Fig. 1 is a side elevational view, mainly diagrammatic, of a motor truck and semi-trailer having a load handling machine including a boom mounted thereon and embodying my invention, Fig. 2 is a section taken along line 2—2 of Fig. 1, and Fig. 3 is an enlarged detail view of the universal connection shown in Fig. 2.

Referring now to the drawing, and particularly Fig. 1, I have illustrated generally at 10 a motor truck of the type adapted to haul a trailer or semi-trailer generally indicated at 11. Both the motor truck and trailer are preferably mounted on pneumatic tires permitting the usual truck speed when transporting the trailer 11 from one location to another. The trailer 11 comprises a frame 12 having a forwardly extending arm 13. A superstructure including a boom 14 is rotatably supported in the usual manner on frame 12. The elevation of the boom is controlled in a well known manner by supporting cables 15 reeved through sheaves 16 at the boom outer end. The truck 10 can be turned relatively sharply but the trailer 11 must turn on a curve of considerably greater radius with the result that the boom 14 would normally extend a considerable distance laterally of the truck necessitating considerable side clearance.

I have provided a support and guide means generally indicated at 17 rigidly secured to the truck preferably immediately behind the driving compartment 18 and having an upper saddle portion 19 adapted to receive the boom. A conventional truck 10 of this type has a chassis comprising transversely spaced and longitudinally extending channels indicated at 20, the channels being accessible to permit generally U-form straps 21 to be disposed therearound. An angle 22 extends transversely of the truck 10 immediately behind the driving compartment and is rigidly secured to the channels 20 by projecting the ends of straps 21 through perforations provided therefor in angle 22 and threading nuts 23 thereon. Secured to angle 22 by riveting or otherwise are spaced upstanding angles 24—24 having their confronting legs perforated to form bearings for a rod 25, the rod being restrained against axial movement by pins 26—26 projected therethrough.

Pivotally mounted on rod 25 is a generally rectangular shaped frame preferably formed of upstanding angle members 27—27 having bracing members 28 and 29 secured thereto and a superposed channel member 30. Universally mounted on channel member 30 is a channel member 31, each of the channel members having a bearing member associated therewith provided with generally conical bearing faces confrontingly disposed and secured by a pin 32 projected therethrough. Disposed adjacent each end of channel member 31 is a hook element 33 having an end projected through member 31 and adjustable or removable by manipulation of a bolt 34.

To secure the boom in saddle 19, the hook elements 33 may be turned outwardly and the boom lowered by cables 15 to seat on channel member 31. I contemplate that the hook element 33 may be movable a substantial distance longitudinally of member 31 to accommodate booms of varying widths. The hook elements are then hooked over the lower longitudinally extending angle members of the boom indicated at 35 and tightened to maintain a secure grip thereon. The frame 27 is preferably tilted rearwardly as indicated in Fig. 1 to permit a slight elevating movement of the boom as the truck and trailer pass over uneven terrain.

During travel the superstructure is permitted to rotate thereby freely permitting lateral boom movement relative to trailer frame 12 and as controlled by the guide means 17. Since the boom is engaged by the guide means a substantial distance forwardly of the pivotal connection between the motor truck and arm 13, the boom will tend to follow the truck path in turning, thereby effecting rotation of the superstructure and minimizing the lateral swing of the boom outer end and considerably decreasing the side clearance required.

Upon arriving at the scene of operation, the boom is merely raised by the supporting cables and the turntable and boom may be rotated as desired.

Thus, I have provided a simple arrangement associated with a motor truck for minimizing lateral boom movement during travel permitting the truck and trailer to turn about obstructions affording relatively narrow side clearance and which forms an additional safeguard for life and property.

Although I have shown and described a preferred embodiment of my invention, I contemplate that numerous and extensive departures may be made therefrom without departing from the spirit of my invention and the scope of the appended claims.

Having thus described my invention what I claim is:

1. A support for a boom during transit adapted to be detachably secured to a motor truck comprising a frame, means for rigidly securing the frame to the truck in an upstanding position, an element pivotally secured to the frame to rotate about an axis extending transversely of the truck, a member supported by the element adapted to grippingly engage the boom at a substantial distance from the element axis, a bearing for said member including a pin disposed generally in the plane of the element and rotatably supporting the member, and the bearing surfaces permitting limited rocking of the member relative to the pin.

2. A support for a boom during transit comprising a frame adapted to be rigidly secured to a truck in an upstanding position, an element pivotally secured to the frame to rotate about an axis extending transversely of the truck, a member adapted to grippingly engage the boom at a substantial distance from the element axis, a pair of bearing members, one associated with the member and the other with the element, and the bearing members having cooperating curved bearing surfaces whereby the member may have limited rocking action relative to the element.

3. A support for a boom during transit by a truck comprising a frame, means for detachably and rigidly securing the frame to the truck in an upstanding transverse position, an element pivotally secured to the frame to oscillate about an axis extending transversely of the truck at a substantial distance from the element axis, a member adapted to grippingly engage the boom, and said member being supported by the element to rotate about an axis included generally in the plane of the element and to have a limited universal rocking action relative to said axis.

4. A guide and support means for a boom during transit adapted to be detachably secured to a truck, comprising a generally rectangular frame, means for rigidly clamping the frame to the chassis in an upstanding transverse position, a saddle for supporting the boom, means for adjustably securing the boom to the saddle, a frame element disposed intermediate the saddle and frame pivotally supported by the frame to oscillate about an axis included generally in the plane of the frame, and bearing means between the element and saddle comprising a pair of bearing elements having confronting curved bearing surfaces, one associated with the saddle and the other with the element, and a pin projected through the bearing elements and loosely engaging one of said elements whereby the saddle may rotate about the pin and have universal limited rocking action relative thereto.

5. A guide and support means for a boom during transit comprising an element adapted to be pivotally secured to a truck to rotate about an axis extending transversely of the truck, a saddle for supporting the boom spaced a substantial distance from said axis, means for securing the boom to the saddle, and a bearing intermediate the element and saddle, comprising confronting curved surfaces relatively rotatable whereby the boom may have limited universal rocking movement relative to the element.

ROY H. ZEILMAN.